3,211,780
Patented Oct. 12, 1965

3,211,780
PROCESS FOR THE PREPARATION OF
ALLENE ESTERS
Roman Marbet and Gabriel Saucy, Riehen, and Hans Schmid, Zurich, Switzerland, assignors to Hoffmann-La Roche Inc., Nutley, N.J., a corporation of New Jersey
No Drawing. Filed May 3, 1962, Ser. No. 192,098
Claims priority, application Switzerland, May 10, 1961, 5,516/61
5 Claims. (Cl. 260—471)

The present invention relates to a process for the preparation of allene esters.

The process of the invention is carried out by rearranging an ester of a tertiary ethynyl carbinol by means of a catalytically active salt of an element of Group Ib of the periodic table in neutral or slightly basic organic reaction medium in which the catalyst is soluble. The process of the invention involves the rearrangement of an ester of a tertiary ethynyl carbinol containing the atomic configuration I into the atomic Group II:

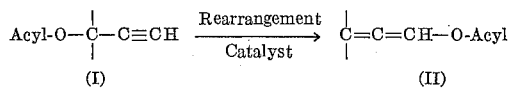

The above rearrangement proceeds readily under the process conditions of the invention in especially good yield.

Preferred starting materials are esters of Formula III:

wherein $R_1$ is a saturated or unsaturated lower alkyl group which can optionally be substituted with a free hydroxy group or an esterified hydroxy group; $R_2$ is a lower alkyl group, preferably methyl, ethyl, or propyl; and $R_1$ and $R_2$ together with the carbon atom to which they are attached can also be a 5- or 6-membered saturated carbocyclic ring, optionally substituted with lower alkyl groups and/or a free hydroxy or an esterified hydroxy group; and Ac is an acyl group from an organic carboxylic acid, e.g. lower alkanoyl, benzoyl, or monosubstituted benzoyl, such as nitrobenzoyl, lower alkyl benzoyl, or halobenzoyl. The esterified hydroxy groups mentioned above contain an acyl group such as the Ac group defined above.

The esters of Formula III are rearranged by the process of the invention into the allene esters of Formula IV:

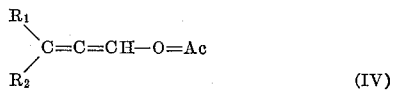

wherein $R_1$, $R_2$ and Ac have the same meaning as above.

Examples of starting materials are the esters of the following tertiary ethynyl carbinols:

3-methyl-1-butyne-3-ol
3-ethyl-1-pentyne-3-ol
3,7-dimethyl-6-octen-1-yn-3-ol
3,6,7-trimethyl-6-octen-1-yn-3-ol
3,7-dimethyl-1-octyne-3-ol
1-ethynyl-1-cyclopentanol
1-ethynyl-1-cyclohexanol
2,2,6-trimethyl-1-ethynyl-1-cyclohexanol
2,2,6-trimethyl-1-ethynyl-1,4-cyclohexanediol
2,2,6-trimethyl-1-ethynyl-4-hydroxy-1-cyclohexanol The rearrangement catalyst employed in the present invention consists essentially of a salt of an element of Group Ib of the periodic system which is soluble in the reaction medium. Especially suitable catalysts are the silver salts, such as silver tetrafluoroborate ($AgBF_4$), silver trifluoroacetate ($AgOCOCF_3$), or silver perchlorate ($AgClO_4$). Other useful catalysts include silver carbonate, silver nitrate, silver palmitate, silver acetate, copper acetate, copper nitrate, copper sulfate, copper oxide, etc.

The arrangement reaction is carried out in the presence of a nonacidic substantially entirely organic solvent. Especially suitable solvents are the ketones, e.g. acetone, diethyl ketone, etc., and the halogenated hydrocarbons, e.g. chlorobenzene, ethylene chloride, chloroform, etc. Other solvents that can be used include dioxane, ethyl acetate, ethanol, aliphatic hydrocarbons, such as n-heptane, etc., benzene, ethylene glycol dimethyl ether, etc.

The preferred method of carrying out the process of the invention consists of dissolving the rearrangement catalyst in an anhydrous solvent containing the starting ester while excluding oxygen, for example, by operating in a nitrogen atmosphere. Acetone is the preferred solvent when silver perchlorate is used as the catalyst, and chlorobenzene is the preferred solvent when the catalyst is silver tetrafluoroborate.

The reaction time varies in general between about 1 and about 24 hours. The reaction temperature is not critical, although temperatures between about 20° C. and the reflux temperature of the reaction mixture are generally employed. For example, when silver perchlorate in acetone is used, practically complete rearrangement of the starting material is obtained after 20 hours under reflux.

The esters of tertiary ethynyl carbinols which are employed as starting materials in the present process which are not known compounds can be prepared by known methods, for example, through condensation of an acetylene with a ketone and esterification of the tertiary ethynyl carbinol formed thereby.

The allene esters of the invention are useful for preparing unsaturated aldehydes; which are easily obtained by saponifying the allene esters. Additionally, the high reactivity of the allene groups enables the compounds prepared by the instant process to undergo further addition reactions.

Additionally, the allene esters prepared by the process of the invention can be used to make unsaturated ketones. If the allene esters are hydrolyzed in an alkaline medium and in the presence of a diluent, preferably a ketone, which is itself reactive with the $\alpha,\beta$-unsaturated aldehyde formed, the latter immediately reacts with the diluent to form an unsaturated ketone. More particularly, it has been found that alicyclic unsaturated ketones of the pseudoionone type can be made in this manner.

The unsaturated aldehydes and ketones produced in accordance with the invention are useful in perfumery as odor-imparting agents, and in organic synthesis as intermediates in the preparation of perfumes, carotenoids, lipo-soluble vitamins, and of steroids.

*Example 1*

3.038 g. of 3-methyl-3-(p-nitro-benzoyloxy)-1-butyne are dissolved in 40 ml. of anhydrous chlorobenzene with gentle warming. To the resulting solution maintained under an atmosphere of nitrogen (bath temperature 35° C.) is added 0.127 g. (5 mol. percent) of anhydrous silver tetrafluoroborate. The reaction mixture is maintained for about 3 hours at 35° C., then cooled to 10° C., and 40 ml. of ethyl alcohol added thereto. The solution then becomes clear. In order to destroy the unreacted starting material a 5% silver nitrate solution (obtained by dissolving 5 g. of silver nitrate in 5 ml. of water and adding ethyl alcohol to 100 ml.) is added with stirring. The resulting gelatinous precipitate is filtered off and washed with alcohol and methylene chloride. The filtrate is adjusted to pH 5-6 with 0.1 N alcoholic sodium hydroxide and concentrated under vacuum to about 30 ml. at a bath temperature at about 20–25°. The concentrate is extracted with ether, the ether solution shaken with water and sodium bicarbonate solution, dried over magnesium sulfate and concentrated to dryness at 25° C. under the vacuum of a water pump. 2.58 g. (85% of theory) of 3-methyl-1-(p-nitrobenzoyloxy)-1,2-butadiene is obtained as a colorless crystalline mass. For purification purposes the crude product is recrystallized twice from hexane. Melting point: 108–111° C. (after sintering). The allene ester which is obtained is sensitive to oxidation, and accordingly, is stored under the exclusion of oxygen.

*Example 2*

0.5 g. of silver perchlorate is added to a solution of 50 g. of 3-methyl-3-acetoxy-1-butyne in 150 ml. of acetone, and the resulting mixture heated in a nitrogen atmosphere for 20 hours under reflux. Thereafter the reaction solution is extracted with petroleum ether (boiling range 40–60°). The petroleum ether extract is washed with saturated sodium bicarbonate solution and water and then dried over anhydrous sodium sulfate. After removal of the solvent under reduced pressure (100 mm. mercury) at 40° C. there is obtained 47.6 g. of a brown oil as a residue, which, from its infrared spectrum, is shown to consist of over 90% 3-methyl-1-acetoxy-1,2-butadiene ($N_D^{23}=1.463$). This product can be purified through distillation, whereupon 36.56 g. of pure 3-methyl-1-acetoxy-1,2-butadiene is obtained. Boiling point: 34° C./4 mm. mercury; colorless liquid of pungent odor $N_D^{24}=1.4610$.

*Example 3*

A solution of 30.8 g. of 3-ethyl-acetoxy-1-pentyne in 150 ml. of acetone is treated according to the process of Example 2 with 0.5 g. of silver perchlorate.

The crude rearrangement product (29.4 g.) consists of over 90% 3-ethyl-1-acetoxy-1,2-pentadiene, according to the IR-analysis. The crude product can be purified through distillation, yielding 26.4 g. of 3-ethyl-1-acetoxy-1,2-pentadiene; boiling point: 30° C./2 mm. mercury; $N_D^{24}=1.4620$; colorless liquid of penetrating odor.

*Example 4*

To a solution of 5 g. of 3-ethyl-3-(p-nitrobenzoyloxy)-1-pentyne in 50 ml. of acetone there is added 0.25 g. of silver perchlorate and the mixture heated for 14 hours under reflux in a nitrogen atmosphere. The reaction mixture is then shaken with a total of 600 ml. of ether. The ether solution is washed with saturated sodium bicarbonate solution and with water, and then dried over anhydrous sodium sulfate. After removal of the solvent (vacuum of a water pump at 50° C.) 4.78 g. of practically pure 3-ethyl-1-(p-nitrobenzoyloxy)-1,2-pentadiene is obtained as a residue in the form of colorless crystals of melting point 80–83° C. Upon recrystallization from hexane an analytically pure sample melting at 82–84° C. is obtained.

In similar manner, the following compounds are obtained in yields of over 50% of theory:

3 - methyl-1-(p-nitrobenzoyloxy)-1,2-butadiene, M.P. 109–110°, from 3 - methyl - 3 - (p-nitrobenzoyloxy) - 1-butyne;

3,7-dimethyl-1-(p-nitrobenzoyloxy)-1,2-octadiene (oily product) from 3,7 - dimethyl - 3 - (p-nitrobenzoyloxy)-1-octyne;

3,7 - dimethyl-1,7-di-(p-nitrobenzoyloxy)-1,2-octadiene of M.P. 106° C. from 3,7-dimethyl-3,7-di-(p-nitrobenzoyloxy)-1-octyne.

The 3,7-dimethyl-3,7-di-(p-nitrobenzoyloxy)-1-octyne is a new compound which can be prepared as follows:

A mixture of 33.4 g. of p-nitrobenzoic acid, 78.8 g. of p-toluenesulfonyl chloride, and 500 ml. of absolute pyridine are stirred for 5 hours at room temperature. To the resulting red solution is added 17.0 g. of 3,7-dimethyl-3,7-dihydroxy-1-octyne, and the resulting mixture stirred for 20 hours at room temperature. Then the reaction mixture is poured into 2 liters of ice water whereupon the p-nitrobenzoate precipitates in almost quantitative yield as a light yellow-colored solid substance which is vacuum filtered and washed several times with water. The crude 3,7-dimethyl-3,7-di-(p-nitrobenzoyloxy)-1-octyne of M.P. 130° C. is purified by recrystallization from acetone-methanol. The pure compound melts as 135–136° C. and shows a U.V. (ethyl alcohol) absorption maximum at 257.5 mm.; $E_1^1=563$.

3,7-dimethyl-3,7-diacetoxy-1-octyne can also be used as a starting material for the rearrangement process of the invention. This compound can be prepared as follows:

34.0 g. of 3,7-dimethyl-3,7-dihydroxy-1-octyne is mixed with 100 ml. of acetic anhydride and after the addition of 1.2 g. of phosphoric acid allowed to stand for 20 hours at room temperature. The temperature in the reaction vessel rises to about 50° C. from the heat of reaction. The reaction mixture is worked up by extraction with petroleum ether and washing 5 times with water. After drying over anhydrous sodium sulfate the solvent is removed at 60° under the vacuum of a water pump, whereupon 45.3 g. of 3,7-dimethyl-3,7-diacetoxy-1-octyne is obtained; $N_D^{23}=1.4459$. Upon fractional distillation under high vacuum there is obtained 31.25 g. of pure diacetate as a colorless oil with the following properties: boiling point at 0.05 mm.=80–83° C.; $N_D^{22}=1.4450$; viscosity $_4^{20}=0.9965$.

The 3,7-dimethyl-3,7-dihydroxy-1 - octyne can be preprepared as follows:

A solution of 6-methyl-6-hydroxy-2-heptanone [J. Amer. Chem. Soc. 77, 1617 (1955)] in ether is added to 1.1 moles of previously prepared sodium acetylide in liquid ammonia. The reaction mixture is stirred under reflux for a period of 20 hours. After evaporation of excess ammonia, the ether layer is treated with solid ammoniumchloride, followed by addition of water. The ether solution is thoroughly washed with water, dried over anhydrous sodium sulfate and concentrated in vacuo. The crude residue, an oil, upon fractional distillation under high vacuum yields the desired diol, which has the following properties: boiling point at 0.1 mm.=103–105° C.; colorless viscous oil ($N_D^{23}$ 1.4660), when freshly prepared; it gradually solidifies and then melts at 44–46° C.

*Example 5*

A solution of 5 g. of 3-ethyl-3-(p-nitrobenzoyloxy)-1-pentyne and 0.2 g. of silver trifluoroacetate in 50 ml. of ethylene chloride (Cl—$CH_2$—$CH_2$—Cl) is heated under nitrogen for 90 minutes at 80° C. After working up the reaction product as in Example 4, there is obtained 4.56 g. of 3-ethyl-1-(p-nitrobenzoyloxy)-1,2-pentadiene in over 90% purity. Melting point: 72–77° C. (In place of ethylene chloride, chlorobenzene, chloroform, diethyl ketone, etc., can be employed as solvent.)

*Example 6*

A solution of 5 g. of 3-ethyl-3-(p-nitrobenzoyloxy)-1-pentyne, 0.25 g. of silver trifluoroacetate and 0.5 ml. of diethyl aniline in 50 ml. of chlorobenzene are heated for 2 hours in a nitrogen atmosphere at 100° C. After working up the reaction product as described in Example 4, there is obtained 4.9 g. of 3-ethyl-1-(p-nitrobenzoyloxy)-1,2-pentadiene in a purity of over 80%; melting point: 70–75° C.

By replacement of the diethyl aniline with dimethylformamide there is obtained the same allene ester in a yield of 4.88 g. (purity over 90%). Melting point: 70–76° C.

*Example 7*

A solution of 5 g. of 3,7-dimethyl-3-acetoxy-6-octen-1-yne (dehydrolinalyl acetate) and 0.2 g. of silver trifluoroacetate in 50 ml. of ethylene chloride is heated for 1.5 hours in a nitrogen atmosphere at 80° C. The reaction mixture is extracted with petroleum ether (total 600 ml.) and the petroleum ether extracts are washed with sodium bicarbonate solution and water. After drying over anhydrous sodium sulfate, the solvent is distilled off (water pump vacuum at 50° C.) leaving 4.88 g. of 3,7-dimethyl-1-acetoxy-1,2,6-octatriene as a residue, which according to IR-analysis is 72% pure;

$$N_D^{23} = 1.4731$$

Through fractional distillation at high vacuum the ester can be obtained pure; a colorless liquid of B.P. 57–61° C./0.04 mm. mercury; $N_D^{20} = 1.4793$.

We claim:

1. A process for the preparation of an allene ester comprising treating under nonacidic conditions an ester of a tertiary ethynyl carbinol of the formula

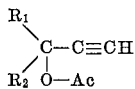

wherein
$R_1$ is selected from the group consisting of lower alkyl, lower alkenyl, and hydroxy and esterified hydroxy derivatives thereof;
$R_2$ is selected from the group consisting of lower alkyl, and, together with the $R_1$ group, forms with the carbon atom to which they are attached a 5-membered and 6-membered carbocyclic ring, and hydroxy and esterified hydroxy derivatives thereof; and Ac and the acyl group of said esterified hydroxy derivatives represent an acyl radical selected from the group consisting of lower alkanoyl, benzoyl, nitrobenzoyl, lower alkylbenzoyl, and halobenzoyl; in a reaction medium which is neutral to slightly basic and contains an organic solvent, with a rearrangement catalyst consisting essentially of a salt of an element of Group Ib of the periodic system which is soluble in the reaction medium, at a reaction temperature in a range of about 20° C. and the reflux temperature of the reaction mixture, to form an allene ester of the formula

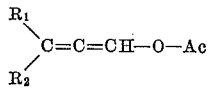

wherein $R_1$ and $R_2$ and Ac have the meaning given above.

2. A process according to claim 1 wherein the catalyst is a silver salt.
3. A process according to claim 1 wherein said ester is an ester of 3,7-dimethyl-6-octen-1-yn-3-ol.
4. A process according to claim 1 wherein said ester is an ester of 3,6,7-trimethyl-6-octen-1-yn-3-ol.
5. A process according to claim 1 wherein said ester is an ester of 3-methyl-1-butyne-3-ol.

References Cited by the Examiner

UNITED STATES PATENTS 3,057,888  10/62  Marbet et al. _____ 260—476 X

OTHER REFERENCES

Jacobs et al.: J. Am. Chem. Soc., 75 (1953, p. 1314).

References Cited by the Applicant

Karrer: Organic Chemistry, 1947, Third English edition, page 66.

Meyer-Schuster Rearrangement (see, e.g., page 1450 of the Merck Index, Seventh edition, 1960).

LORRAINE A. WEINBERGER, *Primary Examiner.*

LEON ZITVER, *Examiner.*

UNITED STATES PATENT OFFICE
CERTIFICATE OF CORRECTION

Patent No. 3,211,780                                    October 12, 1965

Roman Marbet et al.

It is hereby certified that error appears in the above numbered patent requiring correction and that the said Letters Patent should read as corrected below.

Column 1, lines 30 to 33, Formula (III) should appear as shown below instead of as in the patent:

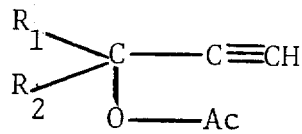

same column 1, line 33, for "(II1" read -- (III) --; same column 1, lines 50 to 53, Formula (IV) should appear as shown below instead of as in the patent:

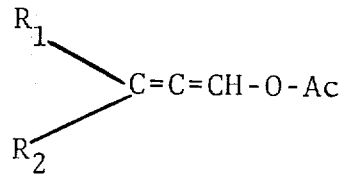

column 2, line 6, for "arrangement" read -- rearrangement --; column 3, line 35, for "3-ethyl-acetoxy-1-pentyne" read -- 3-ethyl-3-acetoxy-1-pentyne --.

Signed and sealed this 21st day of June 1966.

(SEAL)
Attest:

ERNEST W. SWIDER
Attesting Officer

EDWARD J. BRENNER
                                              Commissioner of Patents